(12) United States Patent
Zhou et al.

(10) Patent No.: US 9,367,841 B2
(45) Date of Patent: Jun. 14, 2016

(54) FACILITATING MOBILE DEVICE PAYMENTS USING PRODUCT CODE SCANNING

(76) Inventors: Tiger T G Zhou, Tiburon, CA (US);
Dylan T X Zhou, San Gabriel, CA (US);
Andrew H B Zhou, Tiburon, CA (US)

( * ) Notice: Subject to any disclaimer, the term of this patent is extended or adjusted under 35 U.S.C. 154(b) by 284 days.

(21) Appl. No.: 13/185,491

(22) Filed: Jul. 18, 2011

(65) Prior Publication Data

US 2012/0006891 A1    Jan. 12, 2012

(51) Int. Cl.

| | | |
|---|---|---|
| *G06Q 20/32* | (2012.01) | |
| *G06Q 20/10* | (2012.01) | |
| *G06Q 20/20* | (2012.01) | |
| *G06Q 20/34* | (2012.01) | |
| *G07F 7/08* | (2006.01) | |
| *G07F 7/10* | (2006.01) | |
| *G07F 7/12* | (2006.01) | |
| *G07F 7/02* | (2006.01) | |
| *G07F 17/42* | (2006.01) | |
| *G07G 5/00* | (2006.01) | |
| *G06Q 20/40* | (2012.01) | |
| *G06Q 30/06* | (2012.01) | |
| *G06Q 30/02* | (2012.01) | |

(Continued)

(52) U.S. Cl.
CPC .......... *G06Q 20/3274* (2013.01); *G06K 7/1095* (2013.01); *G06K 19/06112* (2013.01); *G06Q 20/32* (2013.01); *G06Q 20/401* (2013.01); *G06Q 30/0267* (2013.01); *G06Q 30/06* (2013.01); *G06Q 30/0601* (2013.01); *G06Q 30/0641* (2013.01)

(58) Field of Classification Search
CPC ..... G06Q 20/10; G06Q 20/12; G06Q 20/202; G06Q 20/204
See application file for complete search history.

(56) References Cited

U.S. PATENT DOCUMENTS

| | | | | |
|---|---|---|---|---|
| 5,595,264 A | * | 1/1997 | Trotta, Jr. ........................ | 186/56 |
| 5,970,474 A | * | 10/1999 | LeRoy et al. ................... | 705/23 |
| 6,343,276 B1 | * | 1/2002 | Barnett ............................ | 705/28 |

(Continued)

FOREIGN PATENT DOCUMENTS

WO    2011014875 A1    2/2011

OTHER PUBLICATIONS

Julianne Pepitone, Your new waiter is a tablet, May 16, 2011, CNN Money.

(Continued)

*Primary Examiner* — Daniel Walsh
(74) *Attorney, Agent, or Firm* — Georgiy L. Khayet (57) ABSTRACT

Provided are computer implemented methods and systems for facilitating mobile device payments using barcodes displayed on mobile devices and scanned by merchants at checkout counters. When a customer is ready to tender a payment to a merchant, instead of using a credit card, cash, or check, the customer activates an application on his mobile device. The mobile device includes or obtains information about the payment system of this merchant. Furthermore, the mobile device includes or obtains information about the customer/mobile device user and then uses these two pieces of information to generate and display a barcode that encodes customer payment information specific to this merchant. The barcode is scanned at the checkout counter and processed to retrieve customer records from a database of the payment processing system. These records are then used to transfer funds between the merchant and customer, obtain discounts, and/or perform other retail transactions.

16 Claims, 6 Drawing Sheets

(51) Int. Cl.
*G06K 7/10* (2006.01)
*G06K 19/06* (2006.01)

(56) References Cited

U.S. PATENT DOCUMENTS

| | | | | |
|---|---|---|---|---|
| 6,937,998 | B1* | 8/2005 | Swartz et al. | 705/27.1 |
| 7,387,250 | B2 | 6/2008 | Muni | |
| 7,407,094 | B2 | 8/2008 | Myers et al. | |
| 7,600,676 | B1* | 10/2009 | Rados et al. | 235/380 |
| 7,797,204 | B2* | 9/2010 | Balent | G06Q 10/087 |
| | | | | 705/26.8 |
| 7,810,720 | B2* | 10/2010 | Lovett | 235/380 |
| 8,396,808 | B2 | 3/2013 | Greenspan | |
| 2002/0040316 | A1* | 4/2002 | Shin et al. | 705/10 |
| 2003/0102373 | A1* | 6/2003 | Swartz et al. | 235/383 |
| 2004/0020988 | A1* | 2/2004 | Omori | 235/462.01 |
| 2004/0238629 | A1* | 12/2004 | Buchholz | 235/383 |
| 2006/0178916 | A1* | 8/2006 | Domnin | G06Q 10/02 |
| | | | | 705/5 |
| 2006/0278698 | A1* | 12/2006 | Lovett | 235/380 |
| 2007/0022058 | A1* | 1/2007 | Labrou et al. | 705/67 |
| 2007/0130085 | A1* | 6/2007 | Zhu | 705/75 |
| 2007/0138270 | A1* | 6/2007 | Reblin | 235/383 |
| 2007/0194123 | A1* | 8/2007 | Frantz et al. | 235/462.45 |
| 2008/0021829 | A1* | 1/2008 | Kranzley | 705/44 |
| 2008/0052236 | A1* | 2/2008 | Narayanaswami et al. | 705/44 |
| 2008/0059341 | A1* | 3/2008 | Narayanaswami et al. | 705/28 |
| 2008/0126251 | A1* | 5/2008 | Wassingbo | 705/44 |
| 2008/0126261 | A1* | 5/2008 | Lovett | 705/72 |
| 2008/0210754 | A1* | 9/2008 | Lovett | 235/380 |
| 2008/0305827 | A1* | 12/2008 | Barnes et al. | 455/556.1 |
| 2009/0055278 | A1 | 2/2009 | Nemani | |
| 2009/0084840 | A1* | 4/2009 | Williams et al. | 235/379 |
| 2009/0088203 | A1* | 4/2009 | Havens et al. | 455/556.1 |
| 2009/0090783 | A1* | 4/2009 | Killian et al. | 235/462 |
| 2009/0112768 | A1* | 4/2009 | Hammad et al. | 705/44 |
| 2009/0192928 | A1* | 7/2009 | Abifaker | G06Q 30/02 |
| | | | | 705/35 |
| 2009/0222353 | A1* | 9/2009 | Guest et al. | 705/17 |
| 2010/0125509 | A1* | 5/2010 | Kranzley et al. | 705/17 |
| 2010/0131347 | A1* | 5/2010 | Sartipi | 705/14.33 |
| 2010/0138344 | A1* | 6/2010 | Wong et al. | 705/44 |
| 2010/0268592 | A1* | 10/2010 | Shaer | 705/14.38 |
| 2010/0287057 | A1* | 11/2010 | Aihara et al. | 705/16 |
| 2010/0287097 | A1 | 11/2010 | Treadwell | |
| 2011/0029416 | A1 | 2/2011 | Greenspan | |
| 2011/0084149 | A1* | 4/2011 | Faith | G06Q 20/341 |
| | | | | 235/492 |
| 2011/0191244 | A1* | 8/2011 | Dai | 705/44 |
| 2011/0191252 | A1* | 8/2011 | Dai | 705/71 |
| 2011/0233285 | A1* | 9/2011 | Meyer et al. | 235/494 |
| 2011/0246284 | A1* | 10/2011 | Chaikin et al. | 705/14.38 |
| 2012/0000980 | A1* | 1/2012 | Suzuki | G07G 1/0045 |
| | | | | 235/454 |
| 2012/0006891 | A1* | 1/2012 | Zhou et al. | 235/380 |
| 2012/0029994 | A1* | 2/2012 | Barkan et al. | 705/14.25 |
| 2012/0089461 | A1 | 4/2012 | Greenspan | |
| 2012/0091199 | A1* | 4/2012 | Talker | G06Q 20/227 |
| | | | | 235/380 |
| 2012/0136698 | A1* | 5/2012 | Kent | 705/14.1 |
| 2012/0136739 | A1* | 5/2012 | Chung | 705/26.1 |
| 2012/0185317 | A1* | 7/2012 | Wong | 705/14.23 |
| 2012/0205433 | A1* | 8/2012 | Dudek et al. | 235/375 |
| 2012/0209749 | A1* | 8/2012 | Hammad | G06Q 30/06 |
| | | | | 705/27.1 |
| 2012/0284130 | A1* | 11/2012 | Lewis | G06Q 40/00 |
| | | | | 705/16 |
| 2012/0310760 | A1* | 12/2012 | Phillips et al. | 705/26.1 |
| 2012/0310827 | A1* | 12/2012 | Gibson, III | 705/42 |
| 2013/0032634 | A1* | 2/2013 | McKirdy | G06Q 30/0271 |
| | | | | 235/375 |
| 2013/0036058 | A1* | 2/2013 | Kelly | G06Q 20/322 |
| | | | | 705/67 |
| 2013/0048723 | A1* | 2/2013 | King | 235/383 |
| 2013/0073371 | A1* | 3/2013 | Bosworth | G06Q 30/02 |
| | | | | 705/14.35 |
| 2013/0080289 | A1* | 3/2013 | Roy et al. | 705/26.8 |
| 2013/0110678 | A1* | 5/2013 | Vigier et al. | 705/26.61 |
| 2013/0124412 | A1* | 5/2013 | Itwaru | G06Q 20/322 |
| | | | | 705/44 |
| 2013/0124413 | A1* | 5/2013 | Itwaru | G06Q 20/4012 |
| | | | | 705/44 |
| 2013/0168442 | A1* | 7/2013 | Little et al. | 235/375 |
| 2013/0179336 | A1* | 7/2013 | Lyons et al. | 705/39 |
| 2013/0198019 | A1* | 8/2013 | Smith | 705/17 |
| 2013/0238455 | A1* | 9/2013 | Laracey | 705/21 |
| 2013/0240622 | A1* | 9/2013 | Zhou et al. | 235/379 |
| 2013/0246200 | A1* | 9/2013 | Albisu | 705/17 |
| 2013/0290187 | A1* | 10/2013 | Itwaru | G06Q 20/3227 |
| | | | | 705/44 |
| 2013/0332251 | A1* | 12/2013 | Ioannidis | G06Q 20/3224 |
| | | | | 705/14.23 |
| 2014/0006195 | A1* | 1/2014 | Wilson | 705/21 |
| 2014/0025457 | A1* | 1/2014 | Martinez | G06Q 20/20 |
| | | | | 705/14.23 |
| 2014/0025538 | A1* | 1/2014 | Kalgi | G06Q 30/0623 |
| | | | | 705/26.61 |
| 2014/0108252 | A1* | 4/2014 | Itwaru | G06Q 20/3272 |
| | | | | 705/44 |
| 2014/0175167 | A1* | 6/2014 | Argue et al. | 235/383 |
| 2014/0278858 | A1* | 9/2014 | Sullivan et al. | 705/14.15 |
| 2014/0330656 | A1* | 11/2014 | Zhou et al. | 705/16 |
| 2014/0372308 | A1* | 12/2014 | Sheets | G06Q 20/40 |
| | | | | 705/44 |
| 2015/0154592 | A1* | 6/2015 | Ioannidis | G06Q 20/3224 |
| | | | | 705/64 |
| 2015/0379506 | A1* | 12/2015 | Griffin | G06Q 20/322 |
| | | | | 705/44 |

OTHER PUBLICATIONS

Mark Hachman, MobilePay: Your Phone Is Your Credit Card, Sep. 28, 2010, pcmag.com.
MobilePay May Be the Death of the Wallet. Yes, For Real This Time, Sep 28, 2010, TechCrunch.

* cited by examiner

FACILITATING MOBILE DEVICE PAYMENTS USING PRODUCT CODE SCANNING

FIELD

This application relates generally to payment methods using mobile devices in various retail environments and, more specifically, to computer implemented methods and systems facilitating mobile device payments using barcodes.

BACKGROUND

When customers buy product items from various merchants in these merchants' retails environments, such as retail outlets, shopping centers, stores, etc., only a handful of payment methods is available to the customers. Typical examples include credit cards, debit cards, gift cards, checks, and cash. Each one of these payment methods has some drawbacks from cost and/or convenience perspectives. For example, credit cards bear substantial processing fees, while debit cards require availability of funds and sometimes involve surcharges as well. Checks and cash transactions are slow and require additional processing and/or handling. All these drawbacks interfere with retail transactions and add some level of dissatisfaction.

At the same time, a customer typically visits the same group of stores repeatedly, and these payment transaction fees tend to accumulate. While some stores try to issue their own credit-like account systems and employ banks to help them in this endeavor (e.g., Sears—Chase VISA), many stores are simply too small to build and operate systems similar to the ones provide by the major credit card companies and/or banks. Furthermore, a typical customer repeatedly visits multiple retail outlets. Requiring the customer to continuously carry multiple retail cards (or other security/transactional devices) each one being specific to only one of these outlets may be difficult, if not unreasonable. For example, a typical customer may use a few gas stations (e.g., depending on his location), a few grocery stores (e.g., depending on preferences), a few electronic stores (e.g., depending on current sales and promotions). Complexities introduced by store specific account systems may quickly offset any costs savings or inconvenience associated with traditional methods of payments and may make the overall experience even worse.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for facilitating mobile device payments using barcodes displayed on mobile devices and scanned by merchants at checkout counters. When a customer is ready to tender a payment to a merchant, instead of using a credit card, cash, or check, the customer activates an application on his mobile device. The mobile device includes or obtains information about the payment system of this merchant. Furthermore, the mobile device includes or obtains information about the customer/mobile device user and then uses these two pieces of information to generate and display a barcode that encodes customer payment information specific to this merchant. The barcode is scanned at the checkout counter and processed to retrieve customer records from a database of the payment processing system. These records are then used to transfer funds between the merchant and customer, obtain discounts, and/or perform other retail transactions.

In certain embodiments, a computer implemented method for purchasing a product item in a retail environment using a mobile device involves scanning a product code corresponding to the product item to retrieve product information, transmitting the product information to a payment server, and authorizing payment and transmitting authorization to the payment server. One or more of these operations may be performed using a mobile device. The method may also involve registering the mobile device with the payment server by transmitting user account information to the payment server. This user account information corresponds to a payment account at the payment server and may be specific to the user of the mobile device. The registering operation may be performed prior to authorizing the payment and, in certain embodiments, prior to transmitting the product information. The payment account may include various data, such as credit information, debit information, discount information, and loyalty program information.

In certain embodiments, a product code includes one or more of the following codes: a Unified Product Code (UPC) represented as a barcode and/or an alphanumeric string, an Electronic Product Code (EPC) encoded as a printed barcode or encoded on Radio Frequency Identification (RFID) tag, or any other variations of linear barcode, two dimensional barcodes, alphanumeric string (e.g., 8-bit, 16-bit, 32-bit string), electronically encoded codes (e.g., 96-bit strings).

Examples of mobile devices include a cellular phone, a Personal Digital Assistant (PDA), a personal computer (e.g., a tablet or a laptop), a barcode scanner, and an RFID scanner. In general, any device that can be carried by a user into a retail environment, capable of retrieving one or more types of codes listed above, and capable of wirelessly communicating (e.g., via Wi-Fi network, 3G or 4G cellular network, or any other types of wireless communication networks) may be used. In certain embodiments, a mobile device includes a user interface for entering an alphanumeric entry corresponding to the product code. The same or another user interface may be used for entering authorization information.

In certain embodiments, after transmitting the product information to the payment server, the method also involve receiving and displaying on the mobile device various product related data. Some examples of such data include product pricing information, product discount information, product description information, and complementary product information. Product related data may be received from the payment server. Alternatively, the payment server may instruct another server to transmit product related information.

Provided also a server based payment processing method that involves receiving a product information from a mobile device, retrieving product related data from a product database based on the product information received from the mobile device, transmitting the product related data to the mobile device, receiving payment authorization from the mobile device, and transferring a corresponding payment amount from a payment account corresponding to the mobile device to a merchant account. The product information received from the mobile device corresponds to a product code of a product item in a retail environment. The product related data includes at least product pricing information. Other information may include product promotion information, discount information, product description information, and other types of information.

In certain embodiments, the method also involves receiving user account information from the mobile device. The user account information corresponds to the payment account at the payment server. The method may also involve crediting the payment account upon receiving payment from a user of the payment account. In a specific example, product information received from the mobile device is an image of the product code. Alternatively, the mobile device may process the image of the product code and transmit alphanumeric code encoded by the product code.

In certain embodiments, the method involves adding additional product related data into the product database. The additional product related data for each product item corresponds to unique product related information. The unique product related information may include a UPC and/or EPC. The product database may include one or more product related data corresponding to each product item. Some examples of product related data include product pricing information, product discount information, product description information, and complementary product information.

Provided also a computer system for facilitating mobile device payment. In certain embodiments, the system includes an input module for communicating via network with one or more mobile devices and for receiving product information from the one or more mobile devices, and a product database for storing product related data corresponding to each individual product items based on the product information. In certain embodiments, the computer system also includes a payment module for receiving payment authorization from the one or more mobile devices and transferring funds between one or more accounts. Furthermore, the system may include an output module for sending product related data and payment information to the mobile devices.

Provided also a computer-readable medium including instructions, which when executed by one or more processors, perform the following operations. In one operation, product information is received from a mobile device, wherein the product information corresponds to a product code of a product item in a retail environment. In another operation, product related data is retrieved from a product database based on the product information received from the mobile device. The product related data may include at least product pricing information. In yet other operations, the product related data may be transmitted to the mobile device, payment authorization may be received from the mobile device, and a corresponding payment amount may transferred from a payment account corresponding to the mobile device to a merchant account.

Provided also a computer system for facilitating mobile device payment. In certain embodiments, the system includes an input module for communicating via network with one or more mobile devices and for receiving product information from the one or more mobile devices, and a product database for storing product related data corresponding to each individual product items based on the product information. In certain embodiments, the computer system also includes a payment module for receiving payment authorization from the one or more mobile devices and transferring funds between one or more accounts. Furthermore, the system may include an output module for sending product related data and payment information to the mobile devices.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Various computer implemented methods and systems for facilitating mobile device payments using barcodes are described herein. Recent proliferation of mobile devices (e.g., cell phones/smart phones and other similar devices) that are capable of generated and displaying various optical codes (e.g., barcodes) allows implementing these novel methods and systems. Most customers shopping in today's retail environments carry such mobiles devices.

Product codes are typically provided as barcodes, such as linear barcodes and two dimensional barcodes, as well as human readable alphanumeric code. Displaying a barcode may involve processing information to encode into a barcode image. The local processing may be performed using various software applications installed on the mobile device. For example, the Universal Product Code (UPC) or European Article Number (EAN) may be used. UPC is a barcode symbology widely used in North America and other countries for tracking trade items in stores. Its most common form, the UPC-A, consists of 12 numerical digits, which are uniquely assigned to each individual trade/product item. Each UPC-A barcode consists of a scannable strip of black bars and white spaces, above a sequence of 12 numerical digits. No letters, characters, or other content of any kind may appear on a standard UPC-A barcode. The digits and bars maintain a one-to-one correspondence. In other words, there is only one way to represent each 12-digit number visually, and there is only one way to represent each visual barcode numerically. EAN is another example developed as a superset of UPC and adding an extra digit to the beginning of every UPC number. EAN-13 barcodes also indicate the country in which the company that sells the product is based using leading digits. EAN and UPC barcodes are currently the only barcodes allowed for scanning trade/product items at the point of sale. However, other codes may be available in the future and within the scope of this document.

One having ordinary skills in the art would understand that the term "scanning" is not limited to printed codes having particular formats but can be used for codes encoded electronically and using various other means. For example, product codes may be in the form of the recently developed Electronic Product Code (EPC) designed as a universal identifier that provides a unique identity for every physical object (not just a trade item category) anywhere in the world. It should be noted that EPCs are not exclusively used with RFID data carriers. They can be constructed based on reading of optical data carriers, such as linear bar codes and two-dimensional bar codes, such as Data Matrix symbols. For purposes of this document, all optical data carriers are referred herein as "barcodes."

Scanning a barcode may involve capturing an image of the barcode using a simple imaging device installed on a mobile device, such as a digital camera. The image may be then processed on the mobile device to retrieve corresponding product information or sent to the server for further processing. The local processing may be performed using various software installed on the mobile device. In certain embodiments, a mobile device may contain a local database to match the retrieved product information with additional information about this product. However, because of variable nature of this additional information (e.g., pricing, product description), a mobile device then typically transmits the retrieved product information to the server and then receives some additional information from the server.

As stated, many mobile devices have wireless communication capabilities. In addition to being capable of transmitting voice-based signals, many modern cell phones have internet connectivity using cellular networks (e.g., 3G, 4G) as well as Wi-Fi and other types of networks. Some additional examples of such networks are described below with reference to FIG. 1. Wireless communication may be used to transmit retrieved product information to a payment server, receive replies, and transmit authorizations. Overall, various data may be exchanged between the mobile and payment server as well as other servers during operations of the method.

Figure 1:
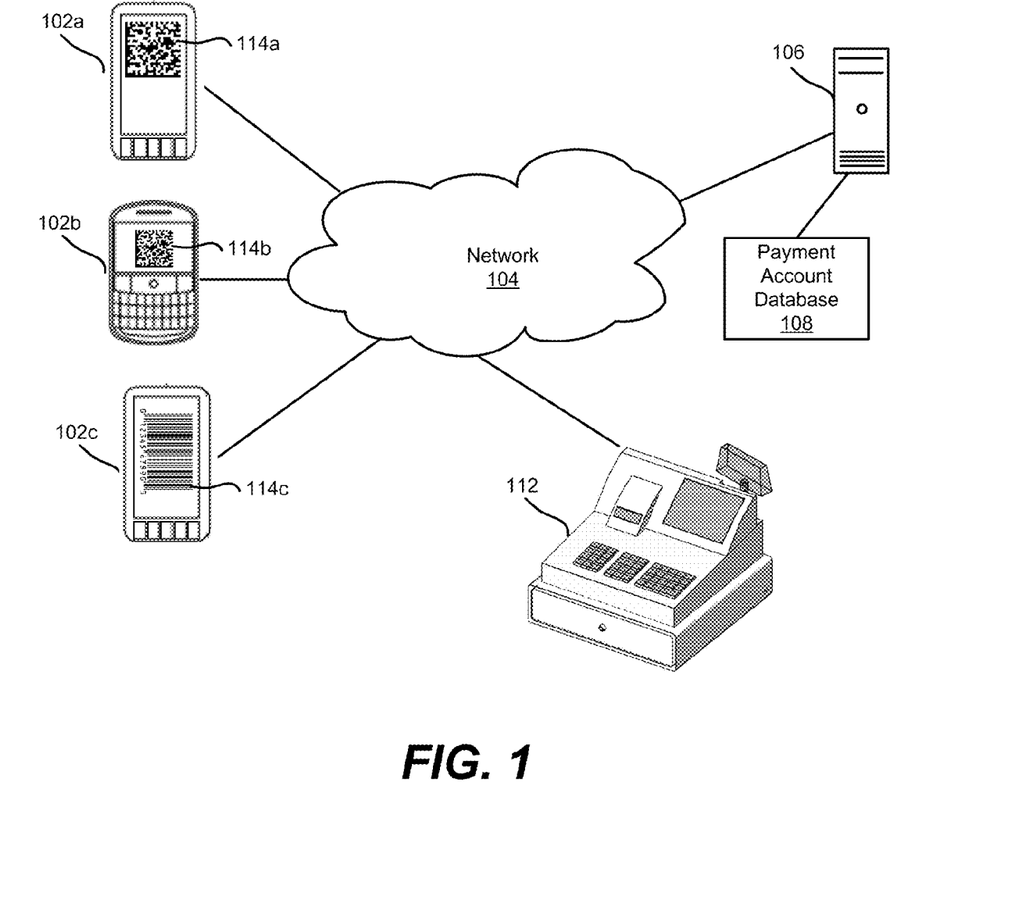
FIG. 1 is a block diagram illustrating an example of the overall system in which various embodiments may be implemented.

Before describing various methods and associated operations, a brief description of a computer network. Specifically, FIG. 1 illustrates an example network segment for implementing various aspects of methods and operations for facilitating mobile device payments in a retail environment using a mobile device. As shown, multiple mobile devices 102a, 102b, 102c may be configured to display barcodes 114a, 114b, 114c. Various examples of barcodes are described above. Mobile devices 102a, 102b, 102c communicate with payment server 106 via network 104. Payment processing server 106 is a part of the payment processing system, which may include payment account database 108 and one or more checkout counters 112. Network 104 may be also used for communication among various components of the payment processing system. Network 104 may take any suitable form, such as a wide area network or Internet and/or one or more local area networks (LAN's). The network 104 may include any suitable number and type of devices, e.g., routers and switches, for forwarding commands, content, and/or web object requests from each client to the online community application and responses back to the clients.

The methods describe herein may also be practiced in a wide variety of network environments (represented by network 104) including, for example, TCP/IP-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

Figure 2:
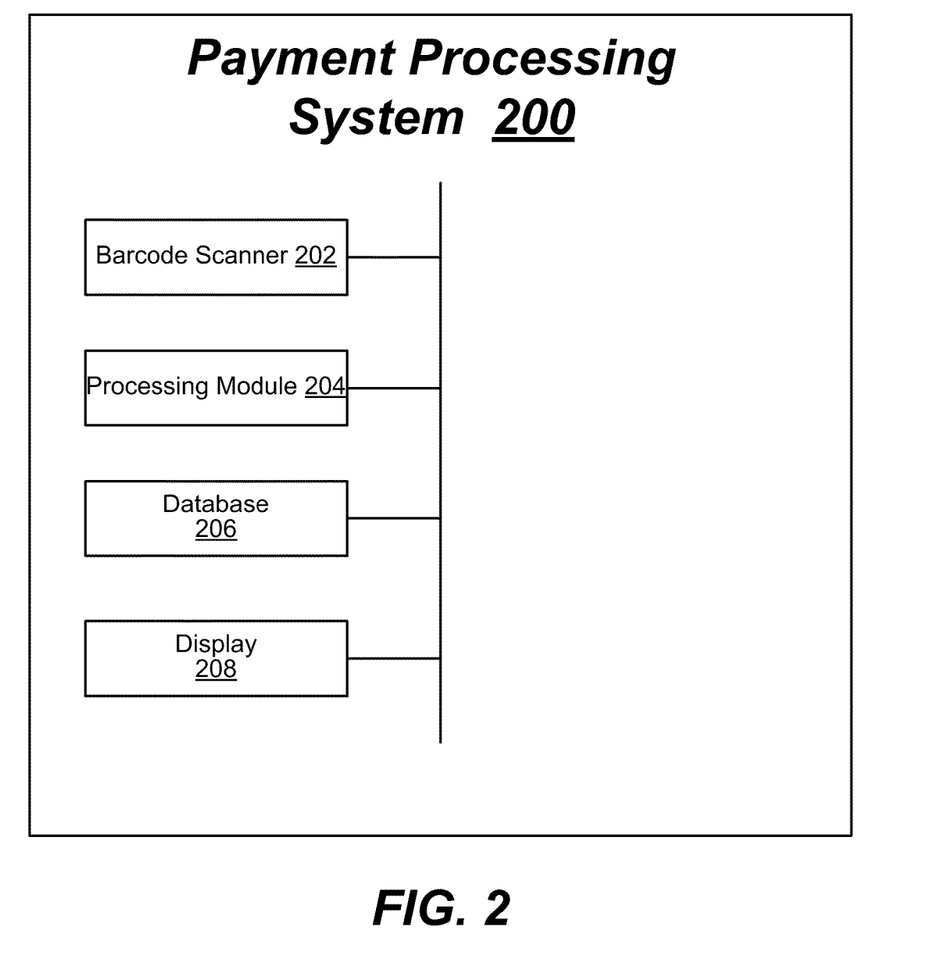
FIG. 2 is a block diagram showing various modules of the payment processing system, in accordance with certain embodiments.

FIG. 2 is a block diagram showing various modules of payment processing system 200, in accordance with certain embodiments. Specifically, payment processing system 200 may include a barcode scanner 202 for scanning at barcode displayed on a screen of a mobile device. Barcode scanner 202 may be provided at a checkout counter. Payment processing system 200 may also include a processing module 204 for retrieving the customer payment information from the scanned barcode. In certain embodiments, payment processing system 200 includes a database 206 for storing one or more customer records. Payment processing system 200 may also include a display 208 for displaying the one or more customer records. In certain embodiments, display 208 provided at the checkout counter together with barcode scanner 202.

Figure 3A:
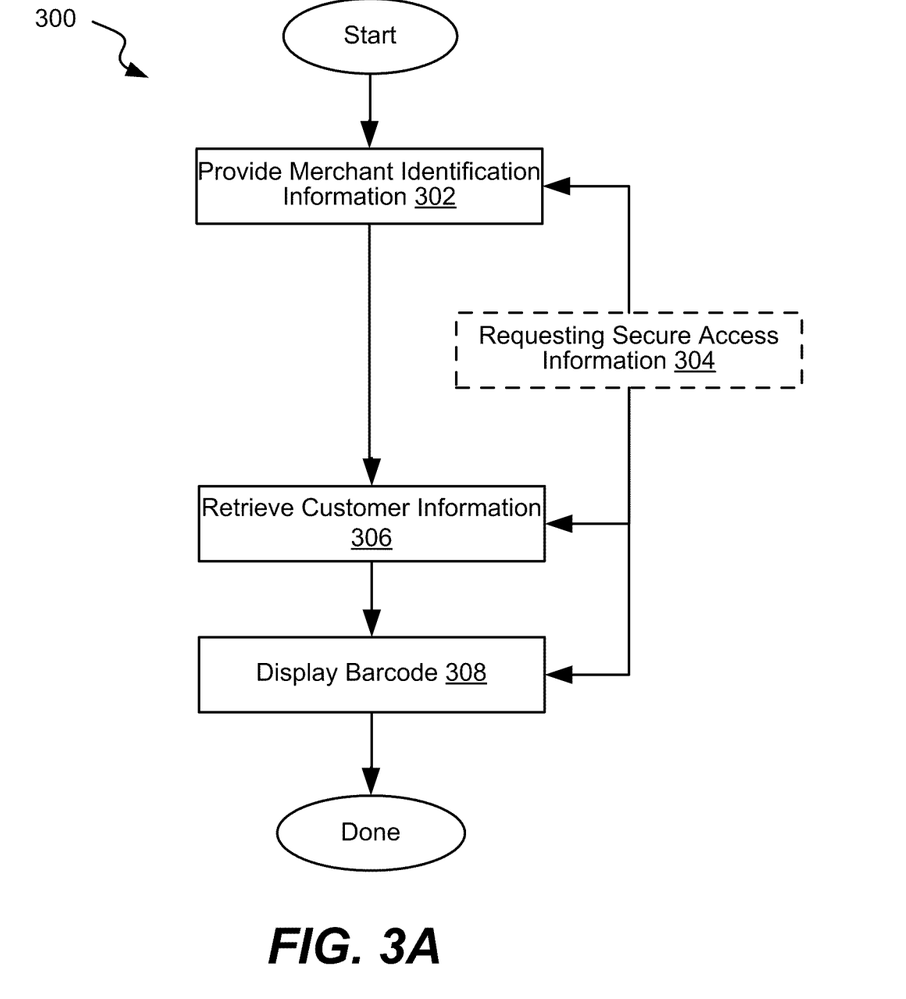
FIG. 3A is a flow chart illustrating a method for facilitating mobile device payments using a barcode displayed on a mobile device, in accordance with certain embodiments.

FIG. 3A is a flow chart illustrating a method for facilitating mobile device payments using a barcode displayed on a mobile device, in accordance with certain embodiments. Process 300 may start with providing merchant identification information onscanning a product code in operation 302. For example, a mobile device may be used to capture an image of the product code. This image is then processed by the mobile device to retrieve product information (e.g., UPC or EAN code) encoded in the product code. In certain embodiments, an actual image of the product code is considered being product information and it is transmitted to the payment server or some other server for further processing. In some instances, machine readable code cannot be scanned. For example, product code image provided of the product item is damaged. In these instances, a user interface of a mobile device in operation 302. The merchant identification information may correspond to a merchant payment system. For example, this operation may involve transmitting user identification information to the merchant payment system. Some examples of a mobile device include a mobile phone and a PDA. Operation 302 may also involve displaying an alphanumeric string on the screen of the mobile device. The alphanumeric string also corresponds to the customer payment information. The alphanumeric string may be used by retail clerk when the barcode is not scannable, for example.

Process 300 may proceed with retrieving customer payment information based on the merchant identification information in operation 306. The customer payment information corresponds to a customer payment account maintained at the merchant payment system. The customer payment information may be stored in a memory of the mobile device. Alternatively, the customer payment information may be retrieved from the merchant payment system. The customer payment information may include a customer name, a customer account number, and/or an amount of available funds.

In certain embodiments, process 300 includes an optional operation 304 performed prior to retrieving customer payment information in operation 306. Operation 304 involves requesting secure access information on the interface of the mobile device. In certain embodiments, a mobile device includes a user interface for entering an alphanumeric entry corresponding to the merchant identification information.

Process 300 also involves displaying a barcode on a screen of the mobile device in operation 308. The displayed barcode is scannable by a barcode scanner of the merchant payment system. This barcode encodes the customer payment information. It may be a linear barcode or a two-dimensional barcode.

Figure 3B:
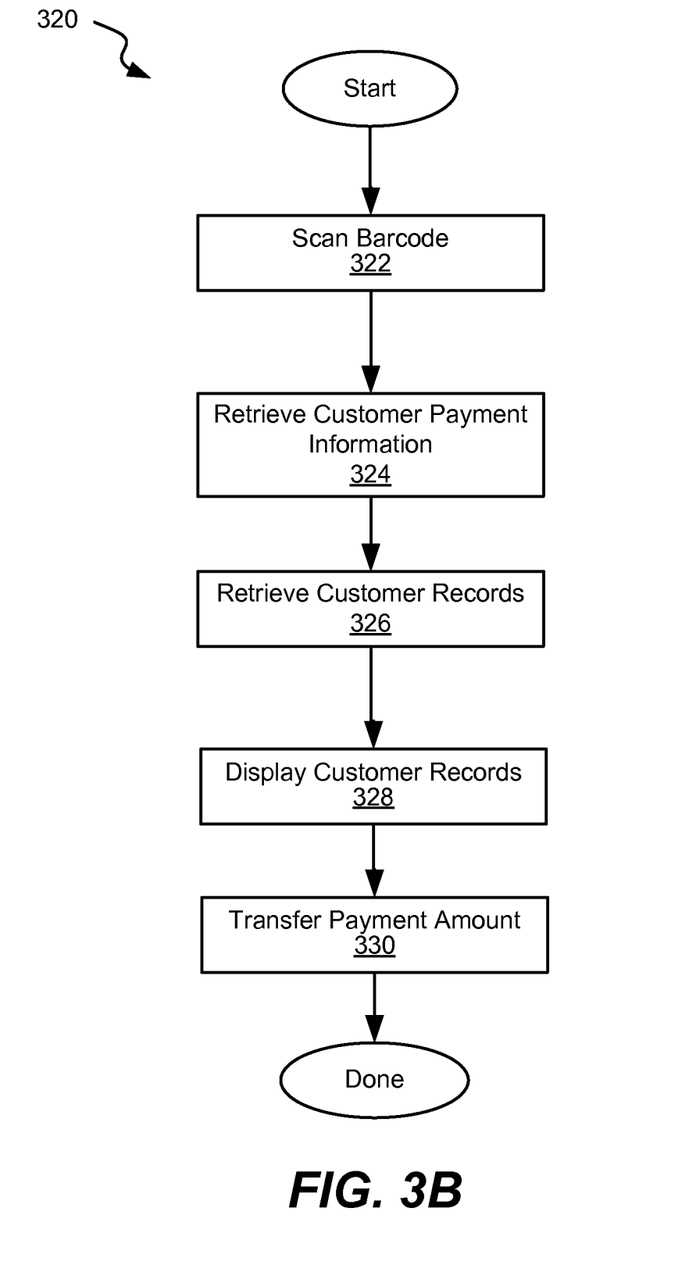
FIG. 3B is a flow chart illustrating a payment processing method using a merchant payment system, in accordance with certain embodiments.

FIG. 3B is a flow chart illustrating a payment processing method using a merchant payment system, in accordance with certain embodiments. Process 320 involves scanning a barcode displayed on a screen of a mobile device during operation 322. As stated above, the displayed barcode encodes customer payment information. This operation may be performed at a checkout counter. Process 320 may proceed with retrieving the customer payment information from the scanned barcode in operation 324. This operation may involve decoding the barcode and retrieving various data string from the barcode. Customer payment information may be used to determine availability of funds. In other embodiments, availability of funds is determined from customer records retrieve in operation 326 described below.

Process 320 may then proceed with retrieving one or more customer records from a database of the merchant payment system in operation 326. These records correspond to the customer payment information. Process 320 may then process with displaying the one or more customer records at the checkout counter in operation 328. Process 320 may involve transferring a payment amount from a customer account to a merchant account in operation 330. This operation may also involve updating the one or more customer records based on the transferred payment amount. Process 320 may also involve receiving user identification information from the mobile device and, based on the user identification information, transmitting the customer payment information to the mobile device.

Process 300 may involve transmitting the product information to the payment server in operation 306. Some Examples of product information include alphanumeric representation corresponding to UPC, EAN, EPC, and other types of codes. This product information may be then correlated to the product related data by the payment server further describe below with reference to FIG. 3B.

Process 300 may involve receiving and displaying product related information in operation 308. Some examples of product related information include product pricing information, product discount information, product description information, and complementary product information.

Finally, process 300 also involves authorizing payment in operation 310. The authorization is transmitted to the payment server and may be used for transferring funds between accounts and/or other purposes (e.g., authorizing credit).

FIG. 3B is a flow chart illustrating a process 320 for purchasing for a product item in a retail environment using a payment server, in accordance with certain embodiments. It should be noted that process 300 described above with reference to FIG. 3A and process 320 described herein are performed in parallel in different parts of the network. Specifically, operations of process 300 are performed by one or more mobile devices, while operations of process 320 are performed by one or more servers.

Process 320 involves receiving product information from a mobile device in operation 322. Examples of product information are described above. Overall, operation 322 is a server-side operation corresponding to operation 306 described above with reference to FIG. 3A. Based on product information, a payment server or some other server may retrieve product related data in operation 326, which is then transmitted to the mobile device in operation 327. Product related data may be added into the product database in an optional operation 324. For example, when a merchant adds another product item (e.g., an SKU) to the retail environment, the corresponding product related information may be added to the product database. Various example of the product related data are described above. Furthermore, process 320 may involve receiving a used account information in operation 324, which s is a server-side operation corresponding to operation 304 described above with reference to FIG. 3A. Similar to operation 304, operations 324 may be performed at any moment prior to receiving payment authorization in operation 328.

Process 320 then proceeds with receiving payment authorization in operation 328. The authorization is sent by the mobile device and may be used a secured protocol for transmission. Based on this authorization, process 320 may then involve transfer of the payment amount in operation 330 from one account to another. In certain specific embodiments, the transfer involves crediting payment amount in operation 329.

Figure 4A:
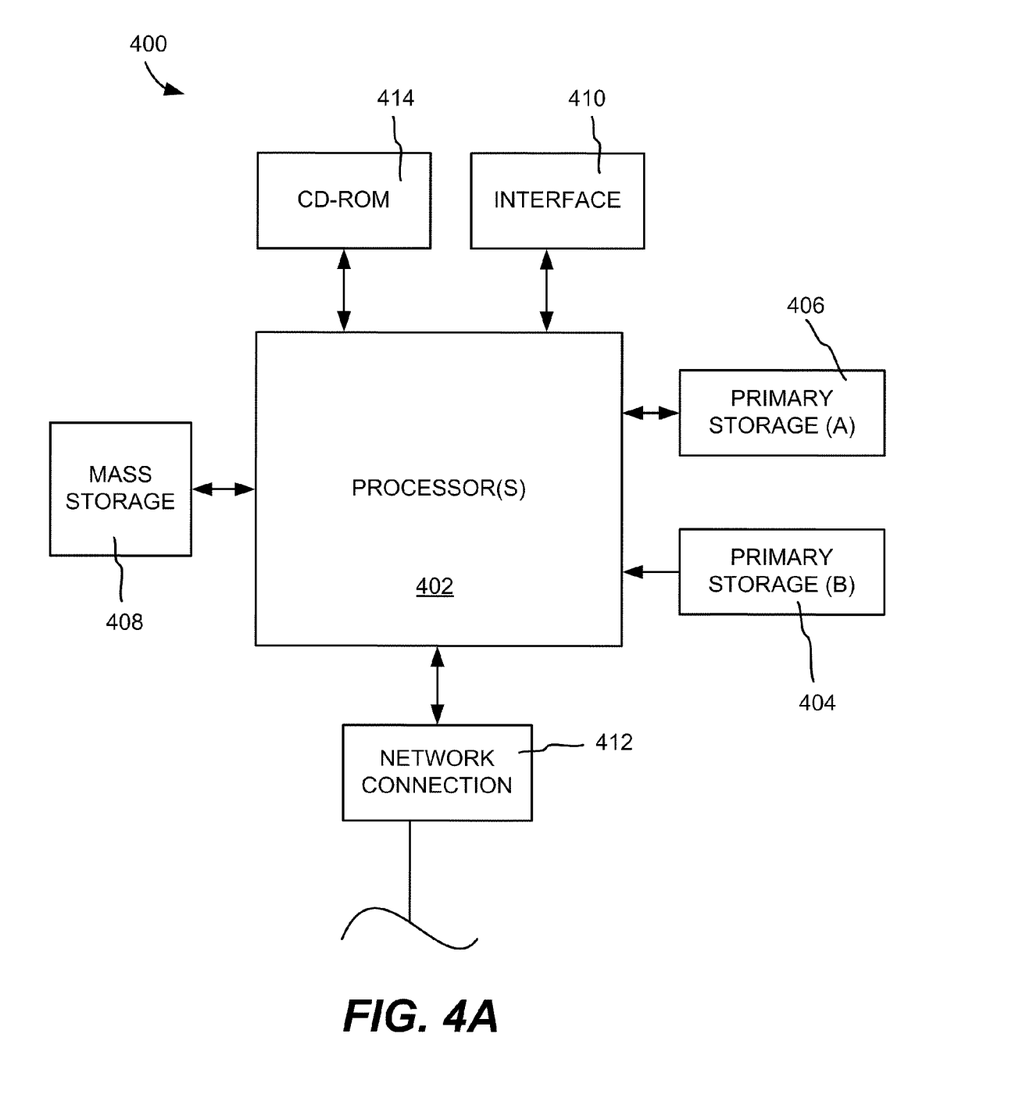
FIG. 4A illustrates an example of a merchant payment system in which various embodiments may be implemented.

FIG. 4A illustrates a computer system that may be configured or designed for performing various operations describe above, in accordance with certain embodiments. The computer system 400 includes any number of processors 402 (also referred to as central processing units, or CPUs) that are coupled to storage devices including primary storage 406 (typically a random access memory, or RAM), primary storage 404 (typically a read only memory, or ROM). CPU 402 may be of various types including microcontrollers and microprocessors such as programmable devices (e.g., CPLDs and FPGAs) and unprogrammable devices such as gate array ASICs or general purpose microprocessors. Primary storage 404 may act to transfer data and instructions uni-directionally to the CPU and primary storage 406 is used typically to transfer data and instructions in a bi-directional manner. Both of these primary storage devices may include any suitable computer-readable media such as those described above. A mass storage device 408 is also coupled bi-directionally to CPU 402 and provides additional data storage capacity and may include any of the computer-readable media described above. Mass storage device 408 may be used to store programs, data and the like and is typically a secondary storage medium such as a hard disk. It will be appreciated that the information retained within the mass storage device 408, may, in appropriate cases, be incorporated in standard fashion as part of primary storage 406 as virtual memory. A specific mass storage device such as a CD-ROM 414 may also pass data uni-directionally to the CPU.

CPU 402 may also be coupled to an interface 410 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to an external device such as a database or a computer or telecommunications network using an external connection as shown generally at 412. With such a connection, it is contemplated that the CPU might receive information from the network, or might output information to the network in the course of performing the operations described herein.

The example embodiments described herein may be implemented in an operating environment including software installed on a computer, in hardware, or in a combination of software and hardware.

Figure 4B:
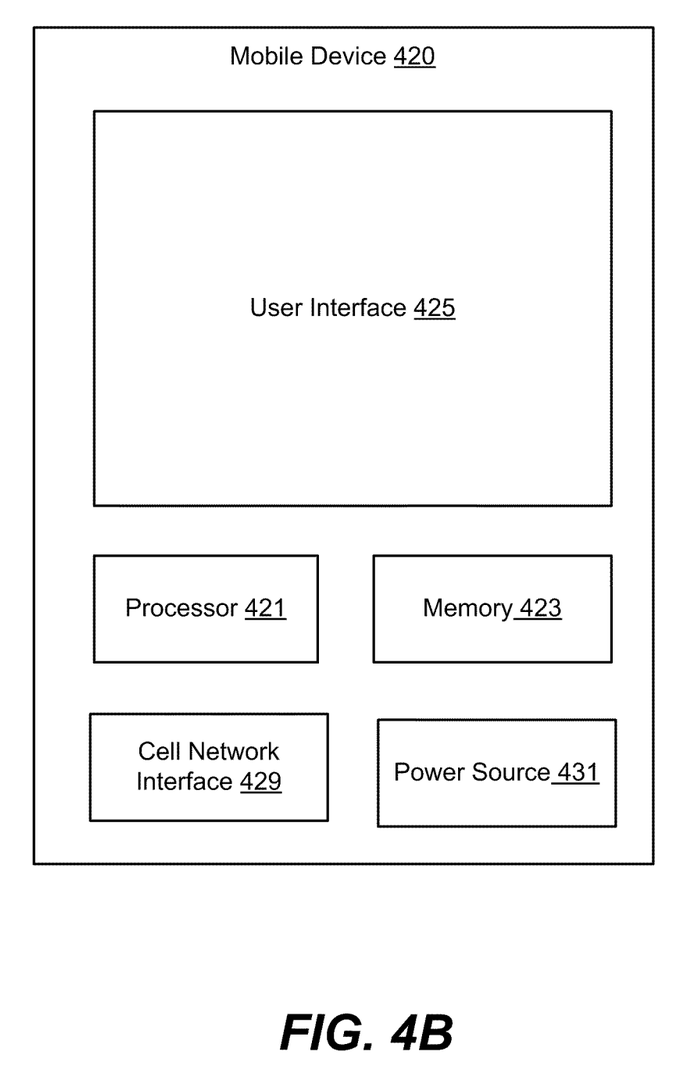
FIG. 4B illustrates an example of a mobile device in which various embodiments may be implemented.

FIG. 4B illustrates a particular example of a mobile device 420. The mobile device 420 includes a processor 421, a memory 423, a user interface 425, a cellular network interface 429, and a power source 431. A processor 421 may be specifically configured to encode various information into one or more barcodes from the product codes. A user interface 425, such as an LCD screen, is configured to display one or more barcodes. Different product information, e.g., retrieves from the product code and/or received from the payment server. Memory 423 may be configured to store various security features associate with the transaction. Furthermore, advanced processing, communicating, scanning and displaying capabilities of the mobile devices and more frequent use of these capabilities may need substantial power outputs provided by the power source 431.

Thus, various systems and methods for purchasing for a product item in a retail environment using a mobile device and a payment server have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for facilitating mobile device payments from a customer payment account to merchant accounts of merchants using barcodes, the computer implemented method comprising:
    reading product codes of corresponding products using a mobile device associated with a customer, wherein merchant identification information is encoded into each of the product codes, and wherein the product codes correspond to products sold by different merchants and have different corresponding merchant identification information encoded therein;
    based on the reading, providing the merchant identification information on a user interface of the mobile device associated with the customer, in accordance with a payment processing system comprising a plurality of merchants, the merchant identification information identifying a merchant in the payment processing system;
    transmitting, from the mobile device, user identification information of the customer to the payment processing system;
    transmitting, from the mobile device, the product codes to the payment processing system;
    subsequent to the transmissions, retrieving customer payment information associated with the customer using the user identification information and the merchant identification information by the payment processing system, the customer payment information corresponding to the customer payment account maintained at the payment processing system associated with the merchant and further including a name of the customer, a customer account number of a financial account, and an amount of available funds;
    based on the user identification information and the merchant identification information, retrieving customer records by the payment processing system, the customer records being maintained at the payment processing system, the customer records including at least discount information associated with the customer and loyalty program information associated with the customer;
    in response to the transmissions and the retrieving, generating, by the payment processing system, a barcode encoding the customer payment information and the customer records;
    transmitting, by the payment processing system, the barcode to the mobile device; and
    displaying the barcode on a screen of the mobile device, wherein the displayed barcode is scannable by a barcode scanner at a checkout counter of the payment processing system, and in response to the scanning, a payment is transferred from the customer payment account to each of the merchant accounts corresponding to the merchant identification information encoded into the product codes.

2. The computer implemented method of claim 1, wherein the customer payment information is stored in a memory of the mobile device.

3. The computer implemented method of claim 1, wherein the barcode is a linear barcode or a two-dimensional barcode.

4. The computer implemented method of claim 1, wherein the mobile device comprises one or more devices selected from the group consisting of: a mobile phone and a PDA.

5. The computer implemented method of claim 1, further comprising displaying an alphanumeric string on the screen of the mobile device, the alphanumeric string corresponds to the customer payment information.

6. The computer implemented method of claim 1, wherein the mobile device comprises a user interface for entering an alphanumeric entry corresponding to the merchant identification information.

7. The computer implemented method of claim 1, further comprising, prior to retrieving customer payment information, requesting secure access information on the interface of the mobile device.

8. A payment processing method for payments from a customer payment account to merchant accounts of merchants using a payment processing system, the payment processing method comprising:
    scanning, by a barcode scanner at a checkout counter of the payment processing system comprising a plurality of merchants, a barcode displayed on a screen of a mobile device of a customer, wherein the barcode encodes customer payment information and customer records, the barcode being generated by the payment processing system in response to receiving product codes of corresponding products, the product codes being read using the mobile device of the customer, each of the product codes encoding merchant identification information, the merchant identification information identifying a merchant in the payment processing system, and wherein the product codes correspond to products sold by different merchants and have different corresponding merchant identification information encoded therein, wherein the barcode is generated based on user identification information and the merchant identification information;
    receiving, by the payment processing system, from the mobile device, the user identification information of the customer;
    retrieving, by the payment processing system, the customer payment information associated with the customer from the scanned barcode, the customer payment information corresponding to the customer payment account maintained at the payment processing system associated with the merchant and further including a name of the customer, a customer account number of a financial account, and an amount of available funds;
    retrieving, by the payment processing system, the customer records of the customer from the scanned barcode, the customer records being stored in a database of the payment processing system, the customer records including at least discount information associated with the customer and loyalty program information associated with the customer; and
    displaying the customer records at the checkout counter so that in response to the displaying a payment is transferred from the customer payment account to each of the merchant accounts corresponding to the merchant identification information encoded into the product codes.

9. The payment processing method of claim 8, further comprising determining availability of funds based on the customer payment information.

10. The payment processing method of claim 9, wherein determining availability of funds is performed based on the customer payment information.

11. The payment processing method of claim 9, wherein determining availability of funds is performed based on the one or more customer records.

12. The payment processing method of claim 8, wherein the displayed barcode is a linear barcode or a two-dimensional barcode.

13. The payment processing method of claim 8, further comprising updating the customer records based on the transferred payment.

14. A payment processing system for facilitating mobile device payments from a customer payment account to merchant accounts of merchants, the system comprising:
- a barcode scanner for scanning a barcode displayed on a screen of a mobile device of a customer, wherein the displayed barcode encodes customer payment information and customer records, the barcode being generated by the payment processing system in response to receiving a product codes of corresponding products, the product codes being read using the mobile device of the customer, the product codes encoding merchant identification information, the barcode scanner being provided at a checkout counter of the payment processing system comprising a plurality of merchants, wherein the barcode is generated based on user identification information and the merchant identification information;
- a processing module for:
  - receiving, from the mobile device, the user identification information of the customer;
  - retrieving the customer payment information associated with the customer from the scanned barcode, the customer payment information corresponding to the customer payment account maintained at the payment processing system associated with the merchant and further including a name of the customer, a customer account number of a financial account, and an amount of available funds; and
  - retrieving the customer records from the scanned barcode, the customer records being maintained at the payment processing system, the customer records including at least discount information associated with the customer and loyalty program information associated with the customer;
- a database configured to store the customer records; and
- a display for displaying the customer records, the display being provided at the checkout counter to the merchant so that in response to the displaying a payment is transferred from the customer payment account to each of the merchant accounts corresponding to the merchant identification information encoded into the product codes.

15. A computer-readable medium comprising instructions, which when executed by one or more processors, causes processor to:
- scan, by a barcode scanner at a checkout counter of a payment processing system comprising a plurality of merchants, a barcode displayed on a screen of a mobile device of a customer, wherein the displayed barcode encodes customer payment information and customer records, the barcode being generated by the payment processing system in response to receiving product codes of corresponding products, the product codes being read using the mobile device of the customer, each of the product codes encoding merchant identification information, the merchant identification information identifying a merchant in the payment processing system, and wherein the product codes correspond to products sold by different merchants and have different corresponding merchant identification information encoded therein, wherein the barcode is generated based on user identification information and the merchant identification information, the user identification information of the customer being received from the mobile device subsequent to scanning the barcode;
- retrieve the customer payment information associated with the customer from the scanned barcode, the customer payment information corresponding to the customer payment account maintained at the payment processing system associated with the merchant and further including a name of the customer, a customer account number of a financial account, and an amount of available funds;
- retrieve the customer records of the customer from the scanned barcode, the customer records being stored in a database of the payment processing system, the customer records including at least discount information associated with the customer and loyalty program information associated with the customer; and
- display the customer records at the checkout counter to the merchant so that in response to the displaying a payment is transferred from the customer payment account to each of the merchant accounts corresponding to the merchant identification information encoded into the product codes.

16. A computer system for facilitating mobile device payments from a customer payment account to merchant accounts of merchants using barcodes, the system comprising:
- an input module for communicating via network with one or more mobile devices of a customer and for receiving product information from the one or more mobile devices, the product information including at least product codes;
- a product database for storing product related data and merchant identification information corresponding to each individual product items based on the product information; and
- a payment module for receiving payment authorization from the one or more mobile devices and transferring funds between the customer payment account and the merchant accounts, wherein the payment authorization is obtained by:
  - scanning a barcode displayed on a screen of the one or more mobile devices by a barcode scanner at a checkout counter of a payment processing system comprising a plurality of merchants, wherein the barcode encodes customer payment information and customer records, the barcode being generated by the payment processing system in response to receiving the product codes of corresponding products and receiving user identification information of the customer from the one or more mobile devices, the product codes being read using the one or more mobile devices of the customer, each of the product codes encoding the merchant identification information, the merchant identification information identifying a merchant in the payment processing system, and wherein the product codes correspond to products sold by different merchants and have different corresponding merchant identification information encoded therein;
  - retrieving, by the payment processing system, the customer payment information associated with the customer from the barcode, the customer payment information corresponding to the customer payment account maintained at the payment processing system associated with the merchant and further including a name of the customer, a customer account number of a financial account, and an amount of available funds; and retrieving, by the payment processing system, the customer records from the barcode, the customer records being maintained at the payment processing system, the customer records including at least discount information associated with the customer and loyalty program information associated with the customer, and wherein in response to the scanning and the retrieving, a payment is transferred from the customer payment account to each of the merchant accounts corresponding to the merchant identification information encoded into the product codes; and an output module for sending the product information to the one or more mobile devices.

\* \* \* \* \*